United States Patent [19]

Furmanczyk

[11] Patent Number: 5,436,820
[45] Date of Patent: Jul. 25, 1995

[54] POWER CONVERTER WITH DUAL PWM CONTROL

[75] Inventor: Kaz Furmanczyk, Marysville, Wash.

[73] Assignee: ELDEC Corporation, Lynnwood, Wash.

[21] Appl. No.: 74,776

[22] Filed: Jun. 9, 1993

[51] Int. Cl.[6] .......................... H02M 1/12; H02M 1/14
[52] U.S. Cl. ........................................ 363/49; 363/41
[58] Field of Search .................... 363/49, 41, 71, 124, 363/20

[56] References Cited

U.S. PATENT DOCUMENTS

| | | | |
|---|---|---|---|
| 4,415,959 | 11/1983 | Vinciarelli | 363/21 |
| 4,441,146 | 4/1984 | Vinciarelli | 363/20 |
| 4,648,020 | 3/1987 | Vinciarelli | 363/71 |
| 4,675,797 | 6/1987 | Vinciarelli | 363/21 |
| 4,930,059 | 5/1990 | Rutt | 363/71 X |
| 5,027,255 | 6/1991 | Zeitlin et al. | 361/395 |

OTHER PUBLICATIONS

"Application Note The UC1901 Simplifies the Problem of Isolated Feedback in Switching Regulators," *Unitrode Integrated Circuits*, pp. 9-46 to 9-57, Jun. 1993.
"Current Mode PWM Controller," *Unitrode Integrated Circuits*, pp. 4-160 to 4-164, Jun. 1993.
"Linear/Switchmode Voltage Regulator Handbook," *Motorola, Inc.* (1989), pp. 95 to 100.
Stan Dendinger, "Application Notes-SG1524 Simplifying Converter Design with a New Integrated Regulating Pulse Width Modulator," *Silicon General* (1990), pp. 12-19 to 12-25.
Reza Amirani, "Application Notes-SG1540 Minimizing the Cost and Complexity of Start-Up Circuits for Switching Power Supplies (1990)", pp.12-105 to 12-111.
Lloyd H. Dixon, Jr., "Unitrode Switching Regulated Power Supply Design Seminar Manual Switching Power Supply Topology Review," *Unitrode Integrated Circuits* (1990), pp. P1-1 to P1-12.
"Unitrode Applications Handbook," *Unitrode Corporation* (1987), pp. 430 to 459.

*Primary Examiner*—R. Skudy
*Attorney, Agent, or Firm*—Christensen, O'Connor, Johnson & Kindness

[57] ABSTRACT

One PWM control circuit is located in the primary side of a power converter and is isolated from the secondary side, and another PWM control circuit is located in the secondary side of the converter and is isolated from the primary side. The first PWM control circuit is powered by a direct tap to the input line of the converter and, during start-up, supplies a low power square wave coupled directly to switching transistors of an inverter of the power converter. After start-up, the second PWM control circuit is powered by a direct tap to the secondary side and supplies a regulating square wave output to the switching transistors through an isolation component such as a coil. After start-up, the primary PWM control circuit is disabled so that, under normal operating conditions, the power supply is regulated only by the second PWM control circuit. The improved power converter has the advantages of direct feedback to the second PWM, without an additional, isolated power supply being required to drive the second PWM.

7 Claims, 3 Drawing Sheets

POWER CONVERTER WITH DUAL PWM CONTROL

FIELD OF THE INVENTION

The present invention relates to the general field of power converters. More specifically, the present invention relates to switching power supplies having automatic feedback control circuits which regulate the on time of a converter to maintain a substantially constant output voltage, despite changing conditions.

BACKGROUND OF THE INVENTION

Known power supplies convert an input power signal having a given set of parameters (voltage-current-power) to a different, preferably stable set of parameters required by the electronic component or circuit fed by the power supply. Modern power supplies use inverters having a switching transistor or transistors which chop the input signal at a high frequency. The chopped signal is applied to the input or primary side of a step-down or step-up transformer. At the output or secondary side of the transformer, the stepped-down or stepped-up signal is rectified and filtered to obtain the desired output. The transformer isolates the secondary side of the converter from the primary side.

As the load driven by the output changes, or as the input power changes, the output voltage also will change, in the absence of a control circuit to regulate operation of the converter. Known systems use pulse width modulation (PWM) feedback techniques to implement the desired control. In general, the output voltage is sensed and compared to a known reference voltage. Depending on the difference between the two voltages, the duration of a square wave pulse is adjusted to alter the on time of the switching transistors. For example, as load is removed or input voltage increases, a slight rise in output voltage will signal the PWM control circuit to deliver shorter pulses to the switching transistors, thereby decreasing the on time of the transistors and lowering the output voltage. Conversely, as the load is increased or input voltage decreases, longer pulses will be supplied to the switching transistors.

As noted above, the main source of isolation between the primary and secondary sides of the power supply is the power transformer. Nevertheless, there necessarily is interaction between the secondary and primary sides by way of the feedback loop through the PWM control circuit. Isolation also must be supplied in the feedback loop.

If isolation is provided between the feedback tap at the output side and the PWM control circuit, the feedback is referred to as "primary side control" because the PWM control circuit is in direct electrical contact with the primary side of the converter. Supplying start-up power to the PWM circuit is simple because of the availability of a direct path to the input line, while still maintaining isolation between the primary side and the secondary side. The output voltage signal is transmitted from the secondary side to the PWM circuit across the isolation boundary, such as through an optical isolator or a magnetic isolator. As compared to a direct feedback line, the signal applied to the PWM circuit is noisier and slower in response time. In addition, the isolation component can be sensitive to temperature changes and electromagnetic radiation, in addition to being less stable and of limited bandwidth.

To avoid the problems associated with primary side control, isolation can be provided between the PWM control circuit and the power inverter, known as "secondary side control" because the PWM control circuit is in direct electrical contact with the secondary side of the converter. In that case, the problems associated with the isolation component in the feedback line between the output and the PWM control circuit are eliminated, but a separate power supply driven by the primary side and still isolated from the secondary side must be provided to power the PWM circuit. In a representative circuit, a separate power transformer is used for auxiliary power, introducing an additional heavy and bulky element into the circuit.

Sometimes, the application for the circuit will dictate whether primary side or secondary side control is used, despite the disadvantages. For example, it may be necessary to provide an additional control signal to the PWM control circuit, coupled to either the primary side or the secondary side, to enable or disable the power supply. If such a signal is coupled to the primary side, primary side control must be used, whereas if such a signal is coupled to the secondary side, secondary side control must be used.

SUMMARY OF THE INVENTION

The present invention provides a power converter having two PWM control circuits, one of which is located in the primary side of the converter and is isolated from the secondary side, and the other of which is located in the secondary side of the converter and is isolated from the primary side. The first PWM control circuit is powered by a direct tap to the input line and supplies a low power square wave coupled directly to the switching transistors of the inverter of the supply. Consequently, start-up of the inverter is substantially immediate—simultaneous with the application of input power.

The second PWM control circuit is located in the secondary side and senses the output voltage by a direct tap to the output line. Such second PWM control circuit supplies a square wave output which is coupled to the switching transistors through a coil. The circuit is configured such that the secondary side PWM control circuit takes over operation of the converter during normal operating conditions to provide the best output regulation. The power for the secondary side regulator is obtained from the secondary side of the converter after start-up.

Unlike a system having only primary side control, there is no necessity for an extra isolation component which can affect operation or reliability of the converter if the ambient conditions change. Nevertheless, at start-up the primary side PWM control circuit is coupled directly to input line and the switching transistors, so that an additional power supply is not required. In addition, the converter can be enabled or disabled by a logic signal referenced to either the primary side PWM control circuit or the secondary side PWM control circuit, or both.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
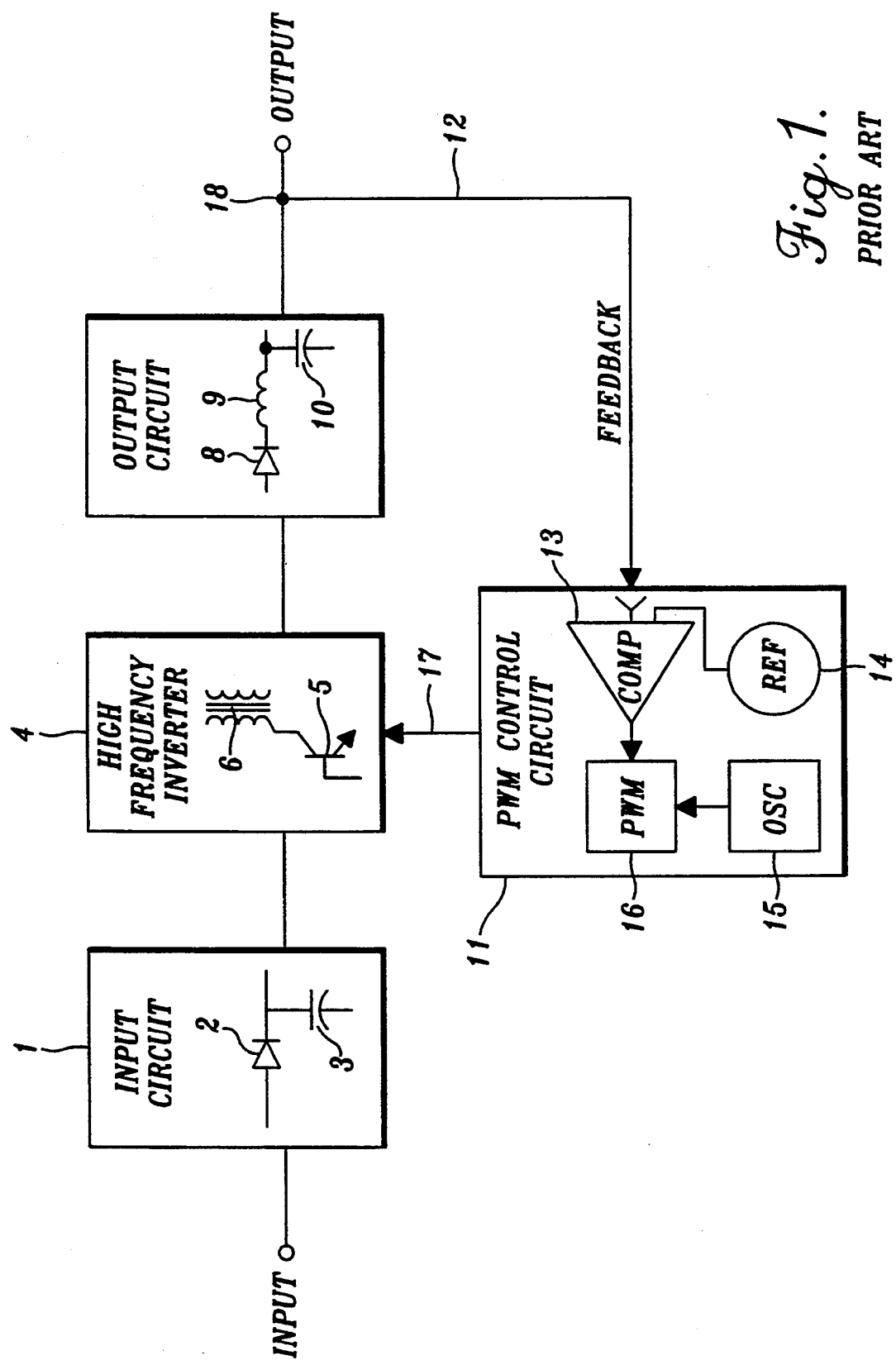
FIG. 1 (Prior Art) is a functional block diagram of a switching power supply of the general type with which the present invention is concerned.

FIG. 1 illustrates diagrammatically a switching power converter of the general type with which the present invention is concerned. Input power is applied to an input circuit 1. In the case of an alternating current input, a diode 2 of the input circuit rectifies the signal. In the case of a direct current input, the diode provides polarity protection so that the converter will not be damaged by inadvertent application of the direct current input with the wrong polarity. A capacitor 3 filters high frequency noise and provides a DC source.

From the input circuit 1 the DC signal is applied to a high frequency inverter 4 which includes one or more switching transistors 5 for chopping the signal at a high frequency. The chopped signal is applied to the primary windings of a power transformer 6. Typically the power transformer is wound such that the signal from the secondary windings of the transformer is of substantially lower voltage. The stepped-down signal from the secondary windings is applied to an output circuit 7 which acts as a rectifier (diode 8) and filter (inductor 9 and capacitor 10).

Under ideal conditions a stable input would be supplied and the output would drive a stable load. However, under normal operating conditions the load is not stable and is applied intermittently, and the input signal also can vary. Consequently, in order to regulate operation of the converter the output signal is applied to a PWM control circuit 11 through a feedback line 12. The PWM circuit is a single integrated circuit having four basic components as illustrated in FIG. 1. A comparator 13 compares the voltage on the feedback line 12 to a known voltage from a reference voltage generating circuit 14. An oscillator 15 provides a fixed frequency signal to the pulse width modulation component 16 which alters the pulse width of an output square wave in accordance with the detected difference between the reference voltage and the feedback voltage. The output of the PWM control circuit 11 is applied to the high frequency inverter 4 through a line 17 to adjust the on time of the switching transistor(s) 5 so as to maintain a stable output voltage.

Not shown in FIG. 1 is the input to output isolation in the feedback line. Another necessary component which is not shown in FIG. 1 is the power supply for the PWM control circuit. In the case of primary side control, an isolation component such as an optocoupler is provided in the feedback line 12 between the output tap 18 and the PWM control circuit 14. In that case, start-up and housekeeping power for the PWM control circuit can be easily obtained by a direct tap on the input line (in the case of a DC input signal) or a direct tap on the line between the input circuit and the inverter (for either a DC or an AC input signal). However, providing an isolation component such as an optocoupler in the feedback line 12 affects the response time and reliability of the converter, and can limit the environments in which it can be used because the isolation component may be sensitive to temperature changes or electromagnetic radiation, for example.

In the case of secondary side control, there is no isolation component in the feedback line 12 between the output and the PWM control circuit. Rather, the square wave output on line 17 is coupled to the high frequency inverter through a simple driver transformer or coil. This system works very well under normal operating conditions. However, a separate component is required to provide start-up power to the PWM circuit, and that component must also be isolated from the secondary side of the converter. Typically, a separate power transformer, with rectification in the case of an AC input, driven from the input line is provided. In some applications, the power transformer can constitute a substantial portion of the weight and bulk of the entire converter, particularly in the case of low frequency operation.

Figure 2:
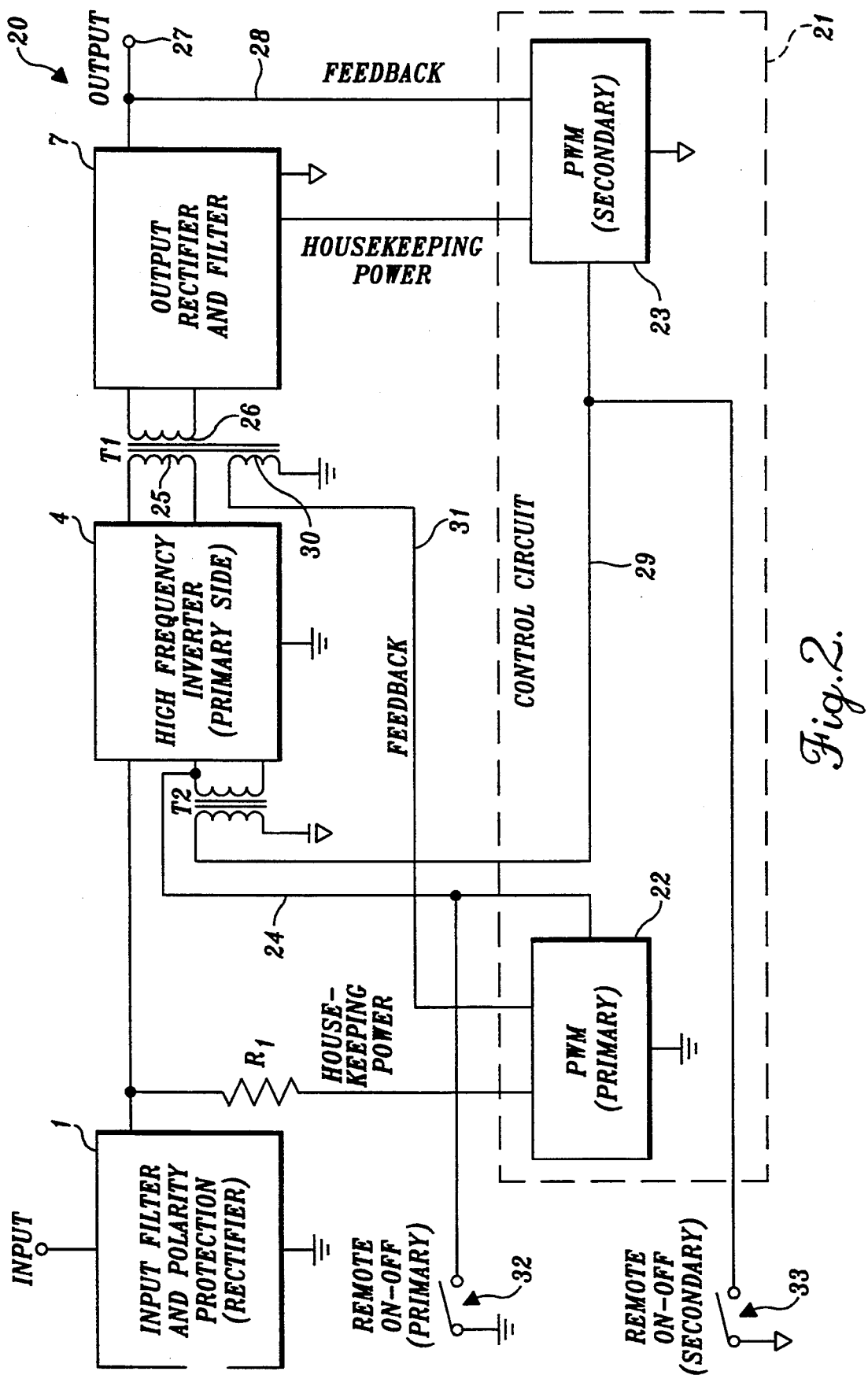
FIG. 2 is a functional block diagram of a power converter with dual PWM control in accordance with the present invention.

With reference to FIG. 2, the power converter 20 in accordance with the present invention is a switching power supply of the same general type as described above but having a control circuit 21 with two modulating components 22 and 23. Preferably, each modulating component is a PWM integrated circuit, one in the primary side isolated from the secondary side and the other in the secondary side and isolated from the primary side. To simplify illustration and understanding of the sides (primary or secondary) to which components are coupled, a different ground symbol is used for components directly coupled at the primary side as compared to components coupled at the secondary side.

The primary PWM 22 operates at start-up to drive the high frequency inverter 4 which can be of conventional design. Thereafter, and under normal operating conditions, the secondary PWM circuit 23 takes over operation of the converter. Consequently, the converter in accordance with the present invention offers the advantages of direct feedback to the PWM control circuit, without requiring a separate bulky and heavy power supply.

More specifically, the input power signal is applied to an input circuit 1 of conventional design. In a representative embodiment the input signal can be a standard 270 volt DC line signal. After filtering (and rectification in the case of an alternating current input signal), the signal is applied to the primary PWM circuit 22 through a resistor R1 to power the PWM circuit. The voltage of the input signal will be much greater than necessary or desirable for driving the primary PWM integrated circuit. Resistor R1 has the effect of stepping down the voltage to the desired level for operating the PWM circuit.

The primary PWM circuit 22 immediately sends a high frequency square wave signal along an output line 24 to the conventional high frequency inverter 4. Such inverter chops the signal from the input circuit 1 and applies it to the primary windings 25 of the power transformer T1. The secondary windings 26 are isolated from the primary windings 25 but are coupled thereto by induction to supply a stepped-down signal. The stepped-down signal from the secondary windings 26 of the power transformer is applied to the output circuit 7 which can be of conventional design for rectifying and filtering the signal. The result is an initially stable signal at the output 27.

Typically, the output circuit will include an LC filter. As the voltage increases, start-up and housekeeping power for the secondary PWM circuit 23 is obtained from additional coil windings associated with the inductor. In addition, the output voltage is fed along a feedback line 28 to the secondary PWM circuit 23 for comparison with the reference voltage. After start-up, and during normal operating conditions, the secondary PWM circuit 23 supplies the desired square wave pulse signal along line 29 to the inverter 4 through a driver transformer T2.

In addition, additional windings 30 can be provided on the power transformer T1 for providing a feedback signal along a line 31 to the primary PWM 22. When sufficient voltage has been generated to activate the secondary PWM circuit 23, the primary PWM circuit 22 is disabled by the signal on the feedback line 31.

Remote "on-off" control of the converter can be achieved from either the primary side or the secondary side. A switch 32 connected to the output line 24 from the primary PWM circuit 22 provides primary side remote operation, whereas a switch 33 connected to the output line 29 of the secondary PWM circuit 23 provides secondary side remote on-off control. Consequently, logic signals, i.e., grounded or not grounded, for enabling and disabling the converter can be referenced from either the primary side or the secondary side.

Figure 3:
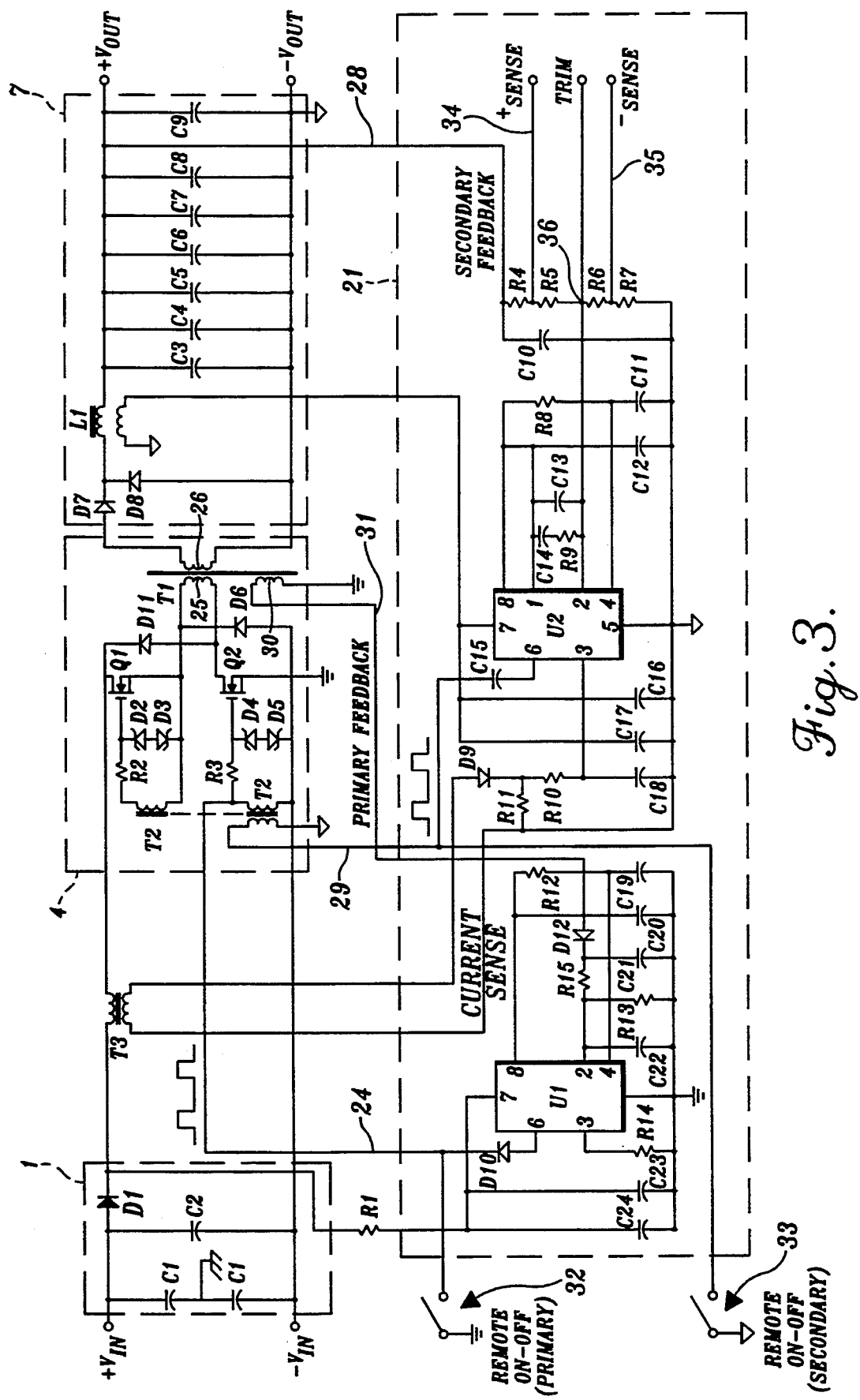
FIG. 3 is a more detailed circuit diagram of the power converter of FIG. 2.

The detailed circuit of a representative embodiment of the present invention is illustrated in FIG. 3 where the components are as follows:

C1: 0.01 $\mu$F–500 V.
C2: 1.5 $\mu$f–500 v.
C3,C4,C5,C6,C7,C8: 47 $\mu$F–10 V.
C9,C10,C12,C15,C16,C20,C23: 0.1 $\mu$F–50 V.
C11: 0.0022 $\mu$F–50 V.
C13,C18,C22: 0.001 $\mu$F–50 V.
C14: 0.01 $\mu$F–50 V.
C17,C24: 15 $\mu$F–25 V.
C19: 100 pF.
C21: 1 $\mu$F–50 V.
R1: 274K$\Omega$–0.25 W.
R2,R3,R4,R7: 10$\Omega$–0.25 W.
R5,R6: 2.74K$\Omega$–0.25 W.
R8,R10: 1K$\Omega$–0.25 W.
R9: 7.5K$\Omega$–0.25 W.
R11: 100$\Omega$–0.25 W.
R12: 3K$\Omega$–0.25 W.
R13: 3.92K$\Omega$–0.25 W.
R14: 100K$\Omega$–0.25 W.
R15: 10K$\Omega$
L1: 8 $\mu$H.
D1,D6,D11: 1N5619.
D2,D3,D4,D5: 1N965.
D7,D8: 30CTQ045.
D9,D10,D12: 1N4148.
Q1,Q2: 2N6802.
U1,U2: UC1845 ("Unitrode" Current Mode PWM Controller).
$V_{IN}$: $\pm$135 V. (270 V.Total input)
$V_{OUT}$: 5 V.

In the embodiment illustrated in FIG. 3, the input voltage is 270 volts DC (minus 135 volts to plus 135 volts). The input circuit 1 consists of capacitors C1, capacitor C2 and diode D1. The high frequency inverter 4 includes MOSFETs Q1 and Q2, clamping diodes D6 and D11, power transformer T1 and driving circuitry including resistors R2 and R3 and diodes D2-D5. The regulating pulse signal is either directly coupled to the transistors through line 24 from the primary PWM circuit which includes integrated circuit U1, or through the driver transformer T2 coupled to the output of the secondary PWM circuit including integrated circuit U2 by way of line 29. Transformer T1 including primary windings 25 and secondary windings 26 isolates the inverter from the output circuit 7. Such output circuit includes diodes D7 and D8, inductor L1, and parallel capacitors C3-C9. The secondary feedback line 28 is coupled directly to the output, but preferably additional feedback lines 34 and 35 ("plus sense" and "minus sense") are connected directly to the load for a more accurate regulation at the load. The tap 36 between resistors R5 and R6 can be used to connect a trimming resistor or potentiometer for fine adjustment of the output voltage. The adjustment range is plus or minus 10% of nominal and is accomplished by changing the voltage sensing divider network R5 and R6. The feedback signal is provided at pin 2 of the integrated circuit U2. Current sensing feedback also is provided to the integrated circuit through transformer T3, diode D9 and resistor R10. Resistor R11 and capacitor C18 are used for filtering high frequency spikes present in the current signal. The capacitors C10, C12, C16 and C17 are for filtering high frequency noise. Timing is controlled by capacitor C11 and resistor R8. Capacitors C13, C14 and resistor R9 form the loop stabilizing network for the regulator U2.

The circuit for the primary PWM including integrated circuit U1 is somewhat simpler because it only operates at start-up. Current sensing is not required, so that pin 3 of U1 can be connected to ground through resistor R14. Otherwise, components of the primary PWM (R12, R13, C19-C24, D10) operate similarly to their corresponding components for the secondary PWM, including integrated circuit U2.

At start-up, power for the primary integrated circuit U1 is supplied at pin 7 through resistor R1 coupled directly to the positive input line. Resistor R1 necessarily will be large because the start threshold for the integrated circuit will be in the range of 7 volts to 8 volts as compared to the input voltage of 270 volts. Thus, the pulse signal applied to the inverter 4 along line 24 will necessarily be of very low power (most power is dissipated through resistor R1), only to support start-up conditions.

At the secondary side, the threshold voltage for the secondary integrated circuit U2 applied at pin 7 (from the additional windings associated with inductor L1) quickly reaches the threshold necessary to provide the pulse output at pin 6 which, through line 29, regulates operation of inverter 4. At the same time, the power transferred through transformer T1 is detected by way of the additional windings 30 for applying a feedback signal to the primary integrated circuit U1 to disable that circuit. In practice, however, it has been found that windings 30, feedback line 31 and the interconnected components R13 and C21 are not always required. The signal from the secondary PWM integrated circuit U2 is of much higher power and the output impedance is much lower because there is no power limitation corresponding to resistor R1. This combination of higher output power and lower input impedance results in the secondary integrated circuit U2 automatically taking over operation of the inverter.

Disabling of the power converter can be achieved by a logic signal referenced to either the primary side or the secondary side, as represented by the switches 32 and 33.

The circuit in accordance with the present invention achieves the essentially immediate start-up of primary side control (U1) and the prompt stable and adaptable regulation of secondary side control (U2) without heavy and bulky auxiliary power supplies, and with the added advantage of enabling-disabling signals referenced to either or both sides.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A power converter for receiving an input power signal and for supplying an output signal having desired parameters comprising an input circuit for receiving the input power signal and for processing such signal, an inverter electrically connected to said input circuit for receiving the processed signal therefrom and for chopping the processed signal, a power transformer having primary windings electrically connected to said inverter for receiving the chopped signal therefrom and secondary windings electrically isolated from said primary windings but coupled thereto by induction for supplying a signal corresponding to the chopped signal, an output circuit electrically connected to said secondary windings for receiving the corresponding signal therefrom and for processing the corresponding signal to produce the output signal having the desired parameters, means driven by feedback from said output circuit for regulating operation of said inverter to adjust the parameters of the output signal, said regulating means including a primary modulator circuit electrically connected between said input circuit and said inverter, powered by said input circuit and supplying a first modulating signal to the inverter for regulating operation thereof and a secondary modulator circuit electrically connected to said output circuit for receiving a feedback signal therefrom and for supplying a second modulating signal to the inverter, and an isolation component between said second modulator circuit and said inverter for electrically isolating said second modulator circuit and said inverter, said power converter having a primary side and a secondary side isolated from said primary side, said primary side including said input circuit, said inverter, said transformer primary windings and said primary modulator circuit, and said secondary side including said transformer secondary windings, said output circuit and said secondary modulator circuit.

2. The power converter defined in claim 1, in which the primary side and secondary side are interconnected such that the primary modulator circuit controls regulation of the inverter during start-up but the secondary modulator circuit controls regulation of the inverter after start-up.

3. The power converter defined in claim 1, including means for disabling the primary modulator circuit when the secondary modulator circuit is supplying a regulating signal to the inverter such that the primary circuit does not control regulation of the inverter.

4. The power converter defined in claim 1, in which the primary modulator circuit includes a first PWM integrated circuit and the secondary modulator circuit includes a second PWM modulator circuit.

5. The power converter defined in claim 1, in which the primary side includes means for receiving an enabling-disabling signal referenced to the primary side and isolated from the secondary side and means for receiving an enabling-disabling signal referenced to the secondary side and isolated from the primary side.

6. The method of converting an input power signal to an output signal having desired parameters which comprises applying the input power signal to an input circuit for producing a processed DC signal, applying the processed DC signal to an inverter for chopping the processed DC signal, applying the chopped signal to the primary windings of a power transformer such that a corresponding signal is supplied at the secondary windings of the transformer by induction from the primary windings, supplying the signal from the secondary windings to an output circuit for producing the output signal having the desired parameters, the input circuit, inverter and primary windings defining a primary side, and the secondary windings and the output circuit defining a secondary side, and including: at start-up, powering a modulator circuit by a direct tap to the primary side and electrically connecting the output of the modulator circuit to the inverter to regulate operation of the inverter during start-up; and, following start-up, powering a secondary modulator circuit, separate and isolated from the first modulator circuit, by a direct tap to the secondary side and supplying the output of the secondary modulator circuit to the inverter through an isolation component for regulating operation of the inverter following start-up; and further including disabling the primary modulator circuit following start-up.

7. The method defined in claim 6, in which the primary modulator circuit includes a first PWM integrated circuit and the secondary modulator circuit includes a second PWM integrated circuit.

* * * * *